United States Patent
Zanger et al.

[11] Patent Number: 6,069,903
[45] Date of Patent: May 30, 2000

[54] METHOD AND DEVICE FOR FREQUENCY CONVERSION, PARTICULARLY FOR THE FREQUENCY DOUBLING OF FIXED FREQUENCY LASERS

[75] Inventors: Eckhard Zanger; Wolfgang Gries, both of Berlin, Germany

[73] Assignee: LAS Laser Analytical Systems GmbH, Germany

[21] Appl. No.: 09/288,377

[22] Filed: Apr. 8, 1999

[30] Foreign Application Priority Data

Apr. 20, 1998 [DE] Germany .................. 198 18 612

[51] Int. Cl.[7] .................................. H01S 3/10
[52] U.S. Cl. .............................. 372/22; 372/107
[58] Field of Search ........................ 372/22, 107

[56] References Cited

U.S. PATENT DOCUMENTS

| | | | |
|---|---|---|---|
| 5,007,065 | 4/1991 | Trutna | 372/94 |
| 5,123,026 | 6/1992 | Fan | 372/75 |

FOREIGN PATENT DOCUMENTS

0369281  5/1990  European Pat. Off. .

OTHER PUBLICATIONS

Technical Information—Introduction to Diode–Pumped Solid–State Lasers; Lightwave Electronics Corp. 1993 pp. 1–16.

P. Curley et al.; Resonant Frequency Doubling of an Actively Mode–Locked Ti:$Al_2O_3$ Laser Using an External Enhancement Cavity; Elsevier Science Publishers B.V. vol. 80, No. 5, 6 1991 pp. 365–369.

*Primary Examiner*—Leon Scott, Jr.
*Attorney, Agent, or Firm*—Londa and Traub LLP

[57] ABSTRACT

The invention relates to a method and device for frequency conversion, particularly for frequency doubling and particularly of continuous fixed frequency laser radiation, of semi-monolithic design with a ring resonator consisting of a mirror and an optically non-linear crystal. The objective of the invention is to develop a generic method and a device by means of which the frequency conversion, particularly the generation of the second harmonic from continuous fixed frequency laser radiation under avoidance of the disadvantages described, with high efficiency, with markedly enhanced opto-mechanical stability and a much simplified ease of production is assured, and is met by application of an electrical voltage to an annular piezo-adjuster 103 arranged between the mirror 101 and the crystal 102.

7 Claims, 1 Drawing Sheet

METHOD AND DEVICE FOR FREQUENCY CONVERSION, PARTICULARLY FOR THE FREQUENCY DOUBLING OF FIXED FREQUENCY LASERS

BACKGROUND OF THE INVENTION

1. Field of the Invention

The invention relates to a method and device for frequency conversion, particularly for frequency doubling and particularly of continuous fixed frequency laser radiation, of semi-monolithic design according to the preambles of claims 1 and 8.

Numerous methods and devices are already known which describe a frequency conversion of continuous laser radiation by means of non-linear crystals, particularly the generation of the 2nd harmonic wave (frequency doubling) from coherent fundamental wave radiation, with the objective of increasing the conversion efficiency.

2. Description of the Related Art

The "classical arrangement" for the frequency conversion of laser radiation as described moreover in the publications of M. Brieger et al.: "Enhancement of Single Frequency SHG in a Passive Ring Resonator" Opt. Commun. 38 (1981) p. 423; C. S. Adams et al.: "Tunable narrow linewidth ultraviolet light generation . . . ", Opt Commun. 90 (1992) p. 89; S. Bourzeix et al.: "Efficient frequency doubling of a continuous wave . . . ", Opt Commun. 99 (1993) p. 89, consists of a resonator in the form of a double Z composed of four mirrors, at least two of which possess a radius of curvature, and a non-linear crystal. A first mirror is mounted on a piezo-element and serves to tune the resonator length to resonance with the incident light wave. The part of the incoming wave reflected by a third mirror is recorded by a detector. A control signal for active resonator stabilisation can be gained from this by the usual methods (Hänsch-Couillaud, Pound-Drever). The mirror distances, radii of curvature and coatings as well as the crystal itself are configured such that a) the resonator is optically stable, b) between the two mirrors positioned in the location of the non-linear crystal a beam-waistline is formed, the size of which is optimal for an efficient conversion, c) the astigmatism of the second beam-waistline caused by the curved mirrors between two further mirrors (third and fourth mirrors) is compensated for by the Brewster cut crystal, d) three of the mirrors possess as high a reflectivity as possible for the fundamental wave, e) one of the mirrors possesses as high a transmission as possible for the harmonic generated, f) the degree of reflection of the coupling input mirror is such that the resonance step-up of the fundamental wave is a high as possible, which is the case where the impedance matching R=1−V (R: degree of reflection, V: passive resonator losses)

g) The precondition for phase matching is fulfilled for the non-linear crystal.

Conversion efficiencies between 10% and 30% are typically attained with such arrangements.

Since four adjustable mirror supports are needed in this arrangement, the mechanical effort is relatively high. Since highly reflecting mirrors always exhibit a residual transmission, the passive losses of this arrangement cannot be reduced at will, resulting in an upper limit for the amplification factor of the resonator. All in all, the arrangements are mechanically too unstable and too large to be used as modules for frequency conversion, particularly frequency doubling for fixed frequency lasers in industrially relevant applications.

In other publications, such as in U.S. Pat. Nos. 5,027,361, 5,227,911, 4,731,787, 4,797,896 monolithic or, as described in U.S. Pat. No. 5,007,065, semi-monolithic arrangements are used.

As opposed to discretely assembled resonators, these arrangements have various advantages:

a) they are of essentially greater mechanical stability and thus less susceptible to external disturbances.

b) they have less losses because of a lower number of boundary faces in the resonator.

c) Expensive precision optical components can be done without.

Doubling efficiencies of up to 80% can be achieved with these arrangements. However, production of the crystals forming the monolithic resonators (U.S. Pat. Nos. 5,027,361, 5,227,911, 4,731,787, 4,797,896), is very troublesome (spherically ground faces, special coatings etc.). These crystals are not available on the market and can only be produced in special laboratories. Characteristics of crystals are also partly used which are only met by a few materials such as, for example, the high coefficient for the electro-optical effect of the crystal material lithium metaniobate, which is used to tune the resonator with an electrical voltage (K. Schneider et al.: "1:1-W single frequency 532 nm radiation by second-harmonic generation of a miniature Nd:YAG ring laser", Optics Letters Vol. 21 No. 24, (1996). Restriction to crystals such as these leads to a marked limitation of the wavelength region which can be doubled in this way. In particular, these arrangements cannot be used for generation of the 2nd harmonic in the region below 300 nm.

A semi-monolithic resonator form is described in U.S. Pat. No. 5,007,065, which, together with the laser medium form proposed, was designed as an active laser resonator. In the form described, this resonator cannot be used as a passive resonator for the generation of optical harmonics in an optically non-linear crystal.

SUMMARY OF THE INVENTION

The objective of the invention is to develop a generic method and a device by means of which the frequency conversion, particularly the generation of the second harmonic from continuous fixed frequency laser radiation under avoidance of the disadvantages described, with high efficiency, with markedly enhanced opto-mechanical stability and a much simplified ease of production is assured. Particularly, the efficient generation of wavelengths below 300 nm for industrial applications is to be made possible.

Fulfilment of the objective is to be found in the characteristics of claims 1 and 9.

As opposed to the known arrangements, the following advantages in particular result from an application of the invention:

1. The arrangement of the components results in an extremely compact design of the conversion unit and can thus be integrated in a fixed frequency laser without appreciably enlarging the design of the system.

2. The form of the optically non-linear crystal exclusively exhibits flat faces and can thus be produced simply and economically in large quantities compared with the competitive methods.

3. The angle of incidence of the fundamental wave on the refracting faces of the crystal as well as the angle of incidence on the curved mirror are small and astigmatism can thus be neglected.

4. The diminishment of passive losses resulting from the reduced number of constructional components implements an essential improvement of the conversion efficiency from the fundamental wave to the harmonic wave.

5. The stability resulting from compactness and the reduced number of components as well as the piezo-adjustment of the resonator length permit an industrially relevant application of continuous UV laser radiation with fixed wavelengths below 300 nm for the first time.

6. As a result of the shorter length of the resonator as compared to the classical design, the free spectral region of the resonator becomes significantly larger. In this way, the acceptance width of the resonator (using the same quality of resonator) is enhanced in terms of the frequency band width of the incident radiation. Thus, laser radiation sources of poorer quality can also be converted with this arrangement.

As demarcation towards the ring laser described in U.S. Pat. No. 5,007,065, the present invention does not involve an active laser resonator in which laser radiation is generated with the aid of a laser medium in a suitable form, but involves a passive ring resonator in which the intensity enhancement generated by the resonant ring form of the fundamental wave incident from without is used for frequency conversion, particularly for generation of the second harmonic wave. In addition, and different from the aforementioned patent, an individual piezo-translator is arranged in such a way between the optical elements that one of the elements serves as a fixed basis for the element situated opposite which is adjustable for the purpose of optimising the resonator length.

BRIEF DESCRIPTION OF THE DRAWINGS

In the following, an example of an embodiment of a passive ring resonator according to the invention is explained in more detail. Shown are.

DESCRIPTION OF THE PREFERRED EMBODIMENTS

Figure 1:
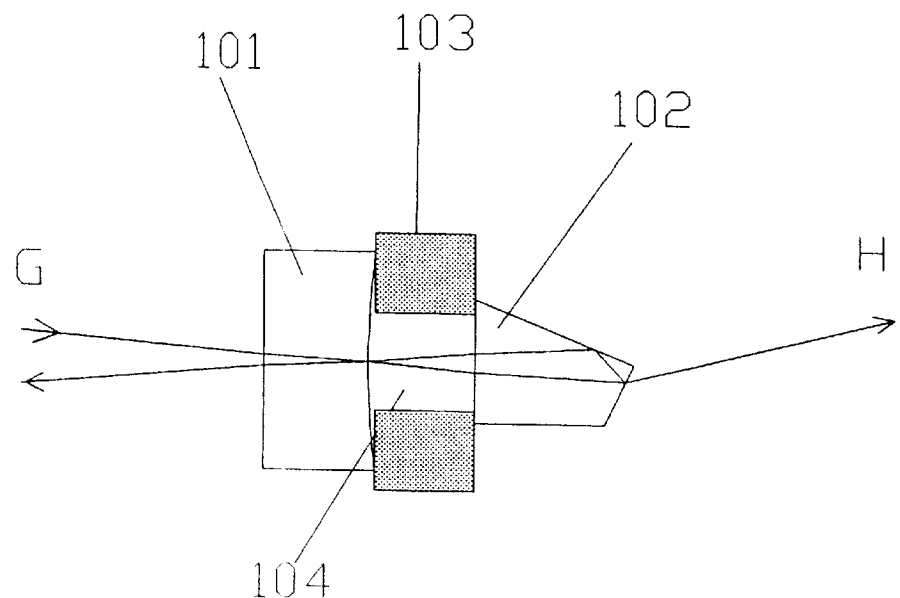
FIG. 1: schematic representation of an embodiment of a passive ring resonator according to the invention.

According to the representation of FIG. 1, the passive ring resonator developed according to the method of the invention consists of a generally spherical mirror 101 and an unsymmetrical optically non-linear crystal 102. The arrangement ensures resonant annular circulation of a coupled in laser radiation. Between the crystal 102 and the mirror 101 an annular piezo-adjuster 103 with a central opening 104 to allow passage of the resonator radiation is arranged. The arrangement is such that either the mirror 101 or the crystal 102 is moveably secured to the piezo-adjuster 103 in such a way that the resonator length can be suitably optimised to counteract any disturbance of the resonance length. In each case, one of the optical elements, either the mirror 101 or the crystal 102 provides a fixed basis opposite the adjustable element used for optimisation of the resonator length.

Figure 2:
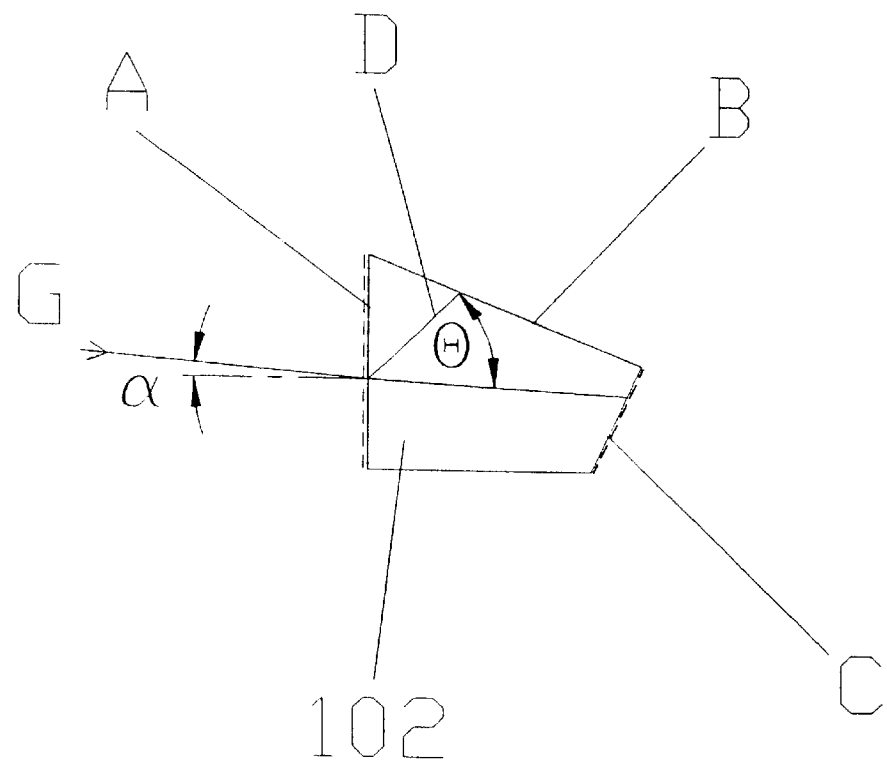
FIG. 2: schematic representation of the crystal in the ring resonator according to FIG. 1.

The form of the optically non-linear crystal 102 according to the representation of FIG. 2 is designed such that the entry face A of the crystal 102 for the fundamental wave radiation G has an antireflective coating. The coating of the entry face A (entry window) is designed to accommodate an entry angle $\alpha$ of the fundamental wave G of approx. 5° so that the residual reflection is less than 0.2%. Face B of the optically non-linear crystal 102 is optically polished in order to make a total reflection of the fundamental wave G possible. Face C serves as a reflection face for the fundamental wave G and as a de-coupling face for the 2nd harmonic wave H generated in the crystal 102 and correspondingly has a highly reflective coating for the fundamental wave G and an antireflective coating for the harmonic wave H.

The invention is not restricted to the embodiment examples described here. On the contrary, it is possible to realise other embodiments by a combination of the features.

What is claimed is:

1. A device for frequency conversion which is adjustable for optimizing resonator length, comprising a ring resonator comprising a mirror and an optically non-linear crystal, and an annular piezo-adjuster located between the mirror and the crystal, the piezo-adjuster having a central opening to allow for passage of resonator radiation between the mirror and the crystal, the crystal being asymmetric, comprising three optically relevant faces A, B and C, entry face A having an antireflective coating, face B being optically polished, and face C having a highly reflective coating as a reflection face for a fundamental wave and an anti-reflective coating to thereby act as a de-coupling face for a second harmonic wave generated by the crystal wherein only one of either the mirror or the crystal is secured with respect to a stationary mount, such that a distance between the mirror and the crystal may be adjusted to optimize resonator length by applying a voltage to the piezo-adjuster to thereby cause an elongation of the piezo-adjuster.

2. The device of claim 1, wherein the coating of entry face A is optimized for an entry angle of the fundamental wave of less than 10 degrees with respect to a normal line of face A.

3. The device of claim 1, wherein the angles of faces A, B and C are such that an angle of incidence at the mirror and an angle of incidence at face A are so small that any astigmatism caused thereby is negligible.

4. The device of claim 1, wherein face C is provided with a dichroic coating.

5. The device of claim 1, wherein the fundamental wave is totally reflected at face B.

6. The device of claim 1, wherein an angle between the fundamental wave and an optical axis of the crystal is chosen to fulfill a condition of phase matching for the frequency conversion.

7. The device of claim 1, wherein the mirror has a radius of curvature chosen such that the ring resonator forms a beam waist within the crystal which is optimal with respect to efficiency of the frequency conversion.

* * * * *